United States Patent [19]

Nagata et al.

[11] Patent Number: 4,869,548
[45] Date of Patent: Sep. 26, 1989

[54] SUNROOF APPARATUS FOR VEHICLE

[75] Inventors: Teruhide Nagata; Shigeru Koizumi, both of Yokohama, Japan

[73] Assignee: Ohi Seisakusho Company, Limited, Yokohama, Japan

[21] Appl. No.: 19,760

[22] Filed: Feb. 27, 1987

[30] Foreign Application Priority Data

Mar. 10, 1986 [JP] Japan .................................. 61-50308
Jun. 24, 1986 [JP] Japan ............................. 61-95298[U]

[51] Int. Cl.⁴ ............................................... B60J 7/05
[52] U.S. Cl. .................................... 296/221; 296/214; 296/223
[58] Field of Search ............... 296/221, 223, 222, 224, 296/216, 214

[56] References Cited

U.S. PATENT DOCUMENTS

| | | | |
|---|---|---|---|
| 4,085,965 | 4/1978 | Schlapp | 296/221 X |
| 4,210,359 | 7/1980 | Mori | 296/222 |
| 4,272,122 | 6/1981 | Schatzler | 296/221 |
| 4,403,805 | 9/1983 | Strem, Jr. et al. | 296/221 |
| 4,601,091 | 7/1986 | Grimm et al. | 296/221 X |
| 4,601,512 | 7/1986 | Boots | 296/221 |
| 4,602,815 | 7/1986 | Boots et al. | 296/222 |
| 4,629,953 | 12/1986 | Inoue et al. | 296/223 X |
| 4,643,478 | 2/1987 | Boots | 296/221 |
| 4,647,105 | 3/1987 | Pollard | 296/221 |
| 4,671,565 | 6/1987 | Grimm et al. | 296/223 X |
| 4,679,846 | 7/1987 | Lux et al. | 296/221 X |
| 4,684,169 | 8/1987 | Igel et al. | 296/224 X |
| 4,725,092 | 2/1988 | Reintges et al. | 296/221 |

FOREIGN PATENT DOCUMENTS

| | | | |
|---|---|---|---|
| 143589 | 6/1985 | European Pat. Off. | 296/223 |
| 2648664 | 5/1978 | Fed. Rep. of Germany | 296/221 |
| 8707603 | 7/1981 | Fed. Rep. of Germany | 296/221 |
| 3311478 | 10/1983 | Fed. Rep. of Germany | 296/222 |
| 0157622 | 12/1981 | Japan | 296/222 |
| 58-41615 | 3/1983 | Japan . | |
| 58-27129 | 6/1983 | Japan . | |
| 59-128012 | 7/1984 | Japan . | |
| 1346506 | 2/1974 | United Kingdom . | |
| 1507757 | 4/1978 | United Kingdom . | |
| 1523538 | 9/1978 | United Kingdom . | |
| 1593555 | 7/1981 | United Kingdom . | |
| 2090565 | 7/1982 | United Kingdom. . | |
| 2120983 | 12/1983 | United Kingdom . | |
| 2122143 | 1/1984 | United Kingdom . | |
| 2133460 | 7/1984 | United Kingdom | 296/221 |
| 2165194 | 4/1986 | United Kingdom . | |

Primary Examiner—Dennis H. Pedder
Attorney, Agent, or Firm—Foley & Lardner, Schwartz, Jeffery, Schwaab, Mack, Blumenthal & Evans

[57] ABSTRACT

A roof opening and closing apparatus for a vehicle including a lid and a pivotal mechanism for opening and closing the lid. The opening and closing mechanism includes three shoes slidable along the vehicle body. One shoe is connected to and supports the forward end of the vehicle lid. The second slidable shoe supports one end of a link. The link is fixed at its middle portion to the third sliding shoe and at its other end to the roof lid. The link pivots as the third sliding shoe is moved forward or backward.

5 Claims, 5 Drawing Sheets

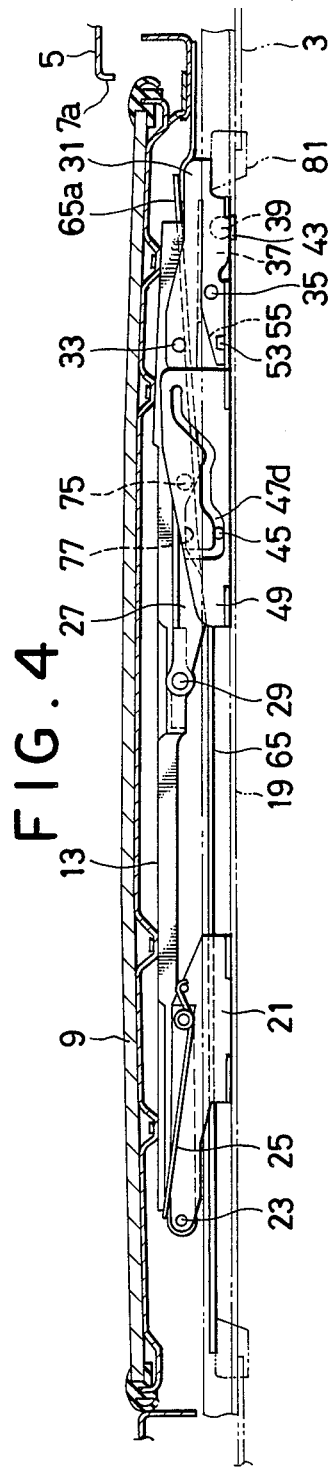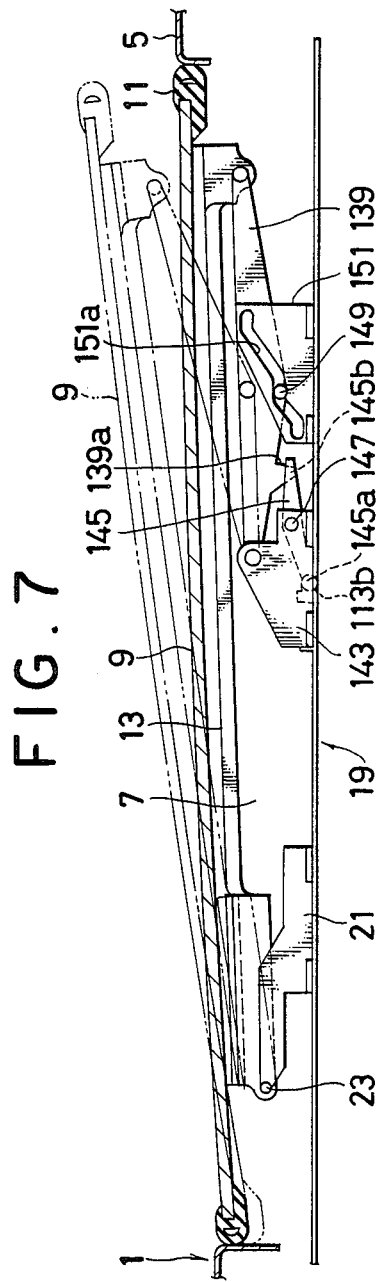

SUNROOF APPARATUS FOR VEHICLE

BACKGROUND OF THE INVENTION

1. Field of the Invention

The present invention relates to a sunroof apparatus and a sunroof lid lifting apparatus for a vehicle.

2. Description of the Prior Art

A sunroof apparatus for a vehicle according to prior art is disclosed in, for instance, the Japanese Patent No. 59-128012. The sunroof apparatus disclosed therein can be moved from a fully closed position to an upwardly tilted position, whereby the roof of the vehicle may be opened and closed roof is raised. The sunroof apparatus is also moveable from a downwardly tilted state, in which the rear end of the lid enters the vehicle interior, to a fully opened state which is attained by sliding the lid. On a lower surface of the lid, guide plates are arranged. Each has ends fitted to a front portion of the lid and to a portion slightly rearward from the center of the lid, respectively. From a rear end of each guide plate to approximately the center thereof, a guide groove tilts forwardly.

The vehicle body includes rails arranged in a longitudinal direction on both sides of a roof opening. Movable members are disposed on the rails respectively. These movable members are provided with guide pins which engage the guide grooves of the guide plates.

By moving the movable members forward, the guide pins are moved in the guide grooves to raise the rear end of the lid, thereby bringing the lid into the upwardly tilted state.

According to such a prior art sunroof apparatus for a vehicle, however, the guide pins are moved together with the movable members to a position in front of the center of the lid as it is tilted upwardly. Therefore, the lid in the upwardly tilted position is supported by its front end portion which is a pivotal center of the lid, and by the guide pins which have been moved to the front side of the center of the lid. Namely, the lid is supported like a cantilever to cause the lid to be rattled by vibration during the vehicle running. Therefore, the rigidity of the lid is not secured.

A lid lifting apparatus for the sunroof according to the prior art has movable shoes which are slid forward or backward to raise or lower the rear end of the lid. The movable shoes are provided with guide grooves which engage with guide pins formed on links for supporting one end of the lid.

Each of the guide grooves comprises a guide portion for full close, a guide portion for upward tilt, and a guide portion for downward tilt. When the movable shoes are slid forward or backward to put the guide pins into the guide portion for full close, the lid is fully closed. When the guide pins are brought to the guide portion for upward tilt, the rear end of the lid is raised to bring the lid into the upwardly tilted state, while, if the guide pins are brought to the guide portion for downward tilt, the lid is put in the downwardly tilted state in which the lid is lowered below a position taken by the lid under the fully closed state.

As described in the above, the guide pins of the links are moved along the guide grooves of the movable shoes so that the links and the movable shoes move relative to each other.

According to the prior art, fitting holes corresponding to the guide grooves are formed on the links, and the guide pins are inserted from the side of the links and passed through the holes and the grooves. Since the fitting work is carried out inside the lid, construction and repair becomes more difficult. If the guide grooves are provided with insertion grooves open toward the outside, the insertion may easily be carried out, but the guide grooves shall partly be cut by the insertion grooves so that the strength and the rigidity of the guide grooves may be reduced.

SUMMARY OF THE INVENTION

In view of the above-mentioned problems, an object of the present invention is to provide a sunroof apparatus for a vehicle, which has reinforced rigidity to prevent a lid, even if it is in the upwardly tilted state, from being rattled by the vibration of a running vehicle.

Another object of the present invention is to provide a lid lifting apparatus for a sunroof, which permits the fitting of guide pins to the apparatus and eliminates the cut of guide grooves to maintain the strength of the guide grooves.

In order to accomplish the objects mentioned in the above, according to the present invention, link members are connected, at one ends thereof, to a lid for opening and closing an opening of a roof of a vehicle, and, at the other ends thereof, to a vehicle body. Movable members are arranged on the vehicle body such that the movable members can move forward and backward. The movable members are provided with guide grooves with which guide members are engaged. The guide members are formed at substantially the center of the link members. When the movable members are moved forward, the lid is brought to an upwardly tilted state.

According to another embodiment of the present invention, there are formed guide grooves on the lid or on movable shoes which can slide forward and backward. The guide grooves lift and lower the lid according to the movement of the movable shoes. Guide pins are provided on the other of the lid and the guide shoes. Insertion grooves which are open outwardly are formed at one ends of the guide grooves. One edge of the opening of each insertion groove is consecutive to the bottom of each guide groove so that each guide pin can removably fitted to the insertion groove.

BRIEF DESCRIPTION OF THE DRAWINGS

The present invention will become more apparent from the following descriptions of the preferred embodiments taken in conjunction with the accompanying drawings in which:

FIGS. 2, 3, and 4 are cross-sectional side views showing a fully closed state, an upwardly tilted state, and a downwardly tilted state respectively, of the sunroof apparatus according to the first embodiment of the present invention;

FIG. 7 is a cross sectional view showing a sunroof apparatus according to a second embodiment of the present invention;

DETAILED DESCRIPTION OF THE PREFERRED EMBODIMENTS

With reference to the drawings, the preferred embodiments of a sunroof apparatus according to the present invention will be described in detail.

Figure 1:
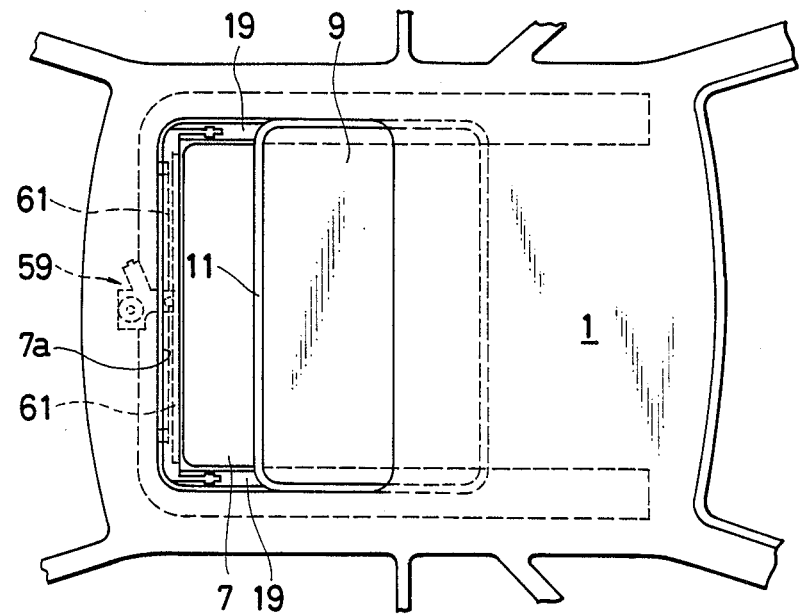
FIG. 1 is a plan view showing a roof portion of a vehicle provided with a sunroof apparatus according to a first embodiment of, the present invention.

FIG. 1 is a view showing a roof portion of a vehicle, particularly of an automobile. In the figure, the left-hand side corresponds to the front side of the vehicle.

Figure 2:
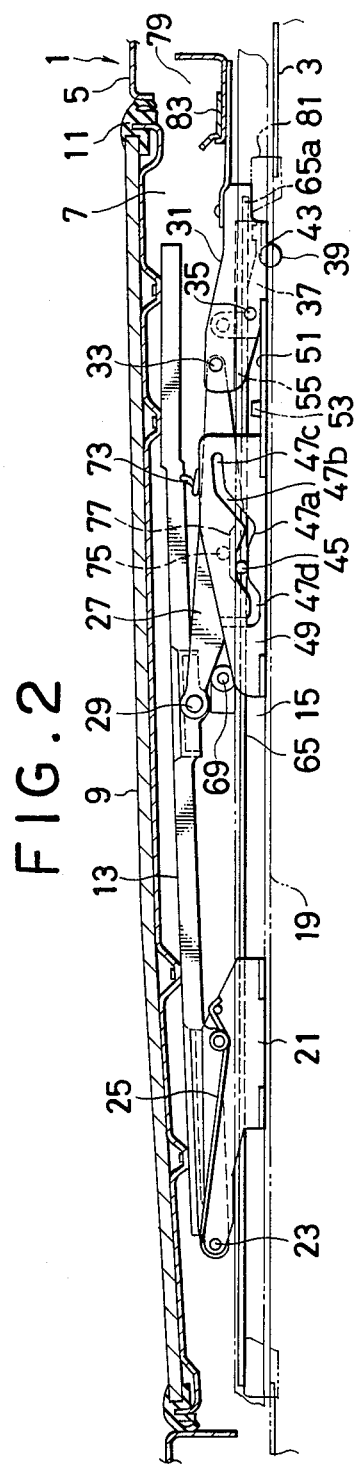
Figure 3:
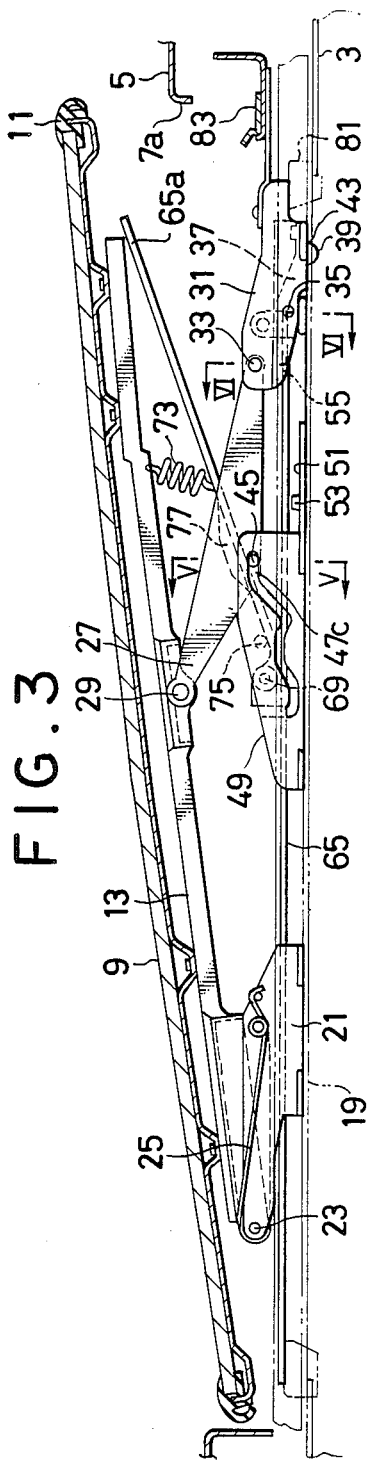

FIGS. 2 to 4 are cross-sectional side views showing respective operational situations of the vehicle sunroof apparatus. In each of the figures, the left-hand side corresponds to the front side of the vehicle.

In the figures, a numeral 1 represents a roof comprising an inner panel 3 and an outer panel 5. At a front portion of the roof 1, there is provided a roof opening 7. The roof opening 7 is provided with a lid 9 for opening and closing the roof opening 7. Fitted to the periphery of the lid 9 is a weather strip 11 which is elastically connected to an edge 7a of the roof opening 7 to seal the roof opening 7 securely when the lid 9 is closed.

Figure 5:
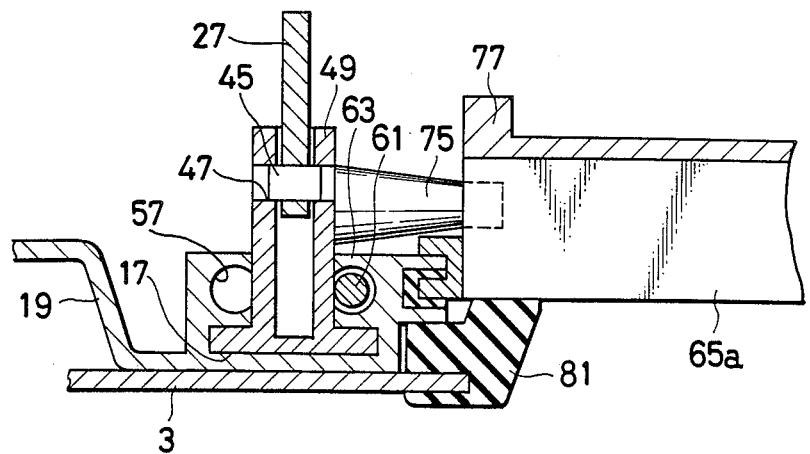
FIG. 5 is an enlarged cross-sectional view taken along a line V—V shown in FIG. 3.

On both sides of the lid 9, there are fitted fitting brackets 13 which extend in the longitudinal direction for substantially the full length of the lid 9. Under the brackets 13 and on both sides of an opening 15 of the inner panel 3, guide rails 19 are disposed in the longitudinal direction. Each guide rail 19 has a rail portion 17, with a channel like cross-section, as shown in FIG. 5.

First movable shoes 21 are disposed in the front portions of the respective rail portions 17 of the respective guide rails 19 such that the first movable shoes 21 can move along the rail portions 17. Each fitting bracket 13 is pivotably connected at its front end to the movable shoe 21 through a pin 23. Any play in the vertical direction in the connecting point of the bracket 13 and the first movable shoe 21 is restricted by a spring 25 fitted to the first movable shoe 21.

Figure 6:
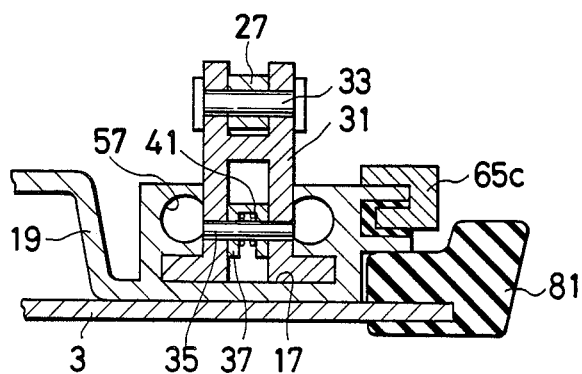
FIG. 6 is an enlarged cross-sectional view taken along a line VI—VI shown in FIG. 3.

A link 27 is pivotably fitted, at one end thereof, through a pin 29 to substantially the center of each fitting bracket 13. The other end of the link 27 is pivotably fitted to a second movable shoe 31 through a pin 33. The second movable shoe 31 is located at a rear portion of the guide rail 19. As shown in FIG. 6, the second movable shoe 31 is movably fitted in the rail portion 17 of the guide rail 19, and is provided at its central portion with a hook 37 which is pivotable around a pin 35. A fitting portion 39 is formed on the rear end portion of the hook 37 to project downwardly therefrom. The hook 37 is not visible from the outside. The hook 37 is pushed in a clockwise direction around the pin 35 by a spring 41 (FIG. 6), and its fitting portion 39 is fitted into a fitting hole 43 formed on the guide rail 19 when the lid 9 is in a fully closed state (FIG. 2) and in an upwardly tilted state (FIG. 3). Thus, the second movable shoe 31 is restricted not to move back and forth in the guide rail 19 when the fitting portion 39 is engaged in fitting holes 43.

Figure 8:
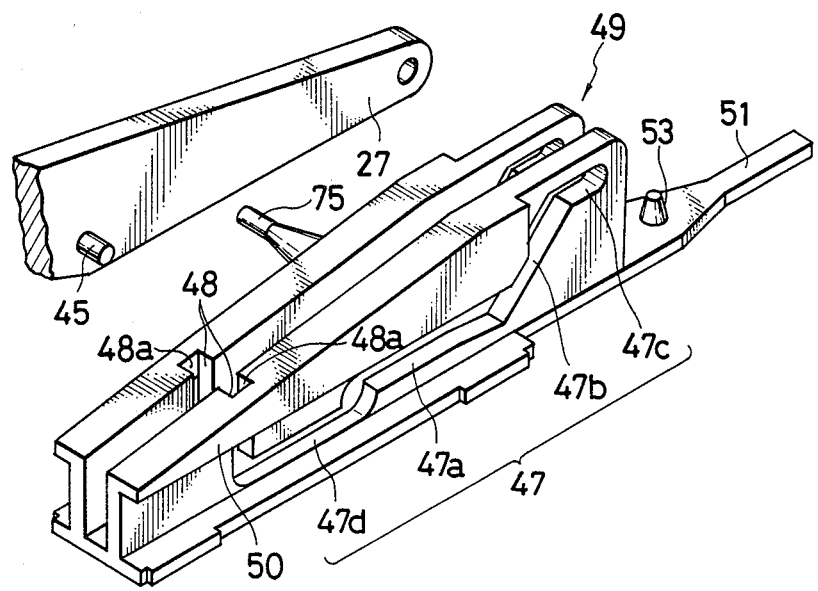
FIG. 8 is a perspective view showing a movable shoe.

As shown in FIG. 8, the link 27 is integrally provided with guide pins 45 which project from the sides of the link 27 to act as guide members. The guide pins 45 engage with guide grooves 47 formed on a third movable shoe 49. Each of the guide grooves 47 comprises a guide portion 47a for fully closing the lid 9, a guide portion 47b for pivotal operation is inclined upwardly from the guide portion 47a for full close to the rear portion of the groove 47, a guide portion 47c for upward tilt extending horizontally from the guide portion 47b for pivotal operation, and a guide portion 47d for downward tilt, extending horizontally from the front portion of the guide portion 47a for full closing. The guide portion 47d for downward tilt being formed slightly below the guide portion 47a for full close. The guide portion 47d for downward tilt is consecutive to an insertion groove 48. The guide portion 47a and the guide portion 47b define a V-shape to prevent the weather strip 11 from being deformed by the pressure of the outer panel 5 at the time when the lid 9 is raised and lowered.

The insertion groove 48 is opened outwardly, and an end of the opening thereof continues to a groove bottom 48a. The groove 48a is formed by a reinforcing rib 50 projecting sidewardly from the body of the third movable shoe 49. The width of the insertion groove 48 is selected such that the guide pins 45 of the link 27 are inserted into the groove and guided to the portion 47d for downward tilt. The rear lower end of the third movable shoe 49 is formed into a projecting tongue 51 which extends rearwardly and has a fitting projection 53 formed thereon to project upwardly.

Figure 9:
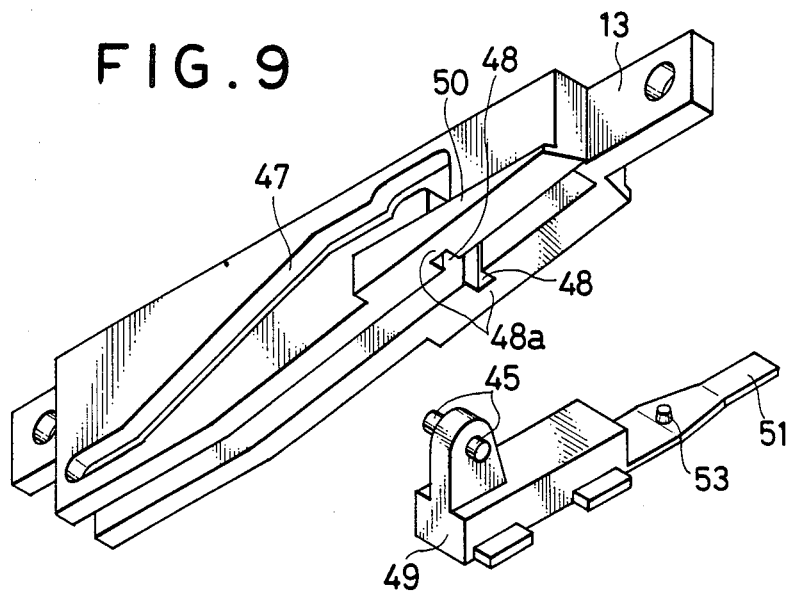
FIG. 9 is a perspective view showing a lid with guide grooves, and a movable shoe with guide pins.

As shown in FIG. 9, the guide grooves 47 may be provided on the fitting bracket 13, and the guide pins 45 on the movable shoe 49.

On the other hand, the hook 37 fitted to the second movable shoe 31 has a fitting hole 55 which is formed on the front side of the hook 37 in the vicinity of the pin 35 to vertically receive the fitting projection 53. When the third movable shoe 49 is moved rearwardly from the fully closed state shown in FIG. 2, the projecting tongue 51 comes under the lower surface of the hook 37 to turn the hook 37 in the counterclockwise direction against the spring 41 (FIG. 6). As a result, the fitting projection 53 and the fitting hole 55 of the hook 37 are engaged with each other, and the fitting hole 43 and the fitting portion 39 are removed from each other. Accordingly, as shown in FIG. 4, the restricted state of the second movable shoe 31 is released, and the second movable shoe 31 and the third movable shoe 49 are connected solidly to each other and, together with the lid 9, can be moved rearwardly in the guide rail 19.

As shown in FIG. 5, side walls which face each other in the rail portion 17 of the guide rail 19 are provided with cable guide grooves 57. In the cable guide groove 57, there is disposed a geared cable 61 which is movable relative to the guide groove 57 and controlled in its movement by a driving portion 59, as shown in FIG. 1. The driving portion 59 comprises a motor, etc., which is rotatable normally and reversely. The geared cable 61 is fixed separately from a fixed portion 63 which is an integral part of the third movable shoe 49. The driving portion 59 for driving the cable 61 is controlled and operated by a manual switch (not shown).

The opening 15, as seen in FIG. 2, of the inner panel 3 is provided with a sunshade 65. The sunshade 65 is divided into a rear half portion and a front half portion. A rear end 65a of the rear half portion of the sunshade 65 is tilted upward sharply around a fitting shaft 69 by a first tilting mechanism, to be described later. Further, by a second tilting mechanism, also to be described later, the rear end 65a of the sunshade 65 is slightly tilted upward.

The first tilting mechanism comprises a coil spring 73 and a presser pin 75. An end of the coil spring 73 is connected to the fitting bracket 13, and the other end thereof to the sunshade 65 to pull the sunshade 65 upward.

The presser pin 75 is provided on the third movable shoe 49. When the presser pin 75 is positioned to a presser releasing position located in front of a cam projection 77 provided on the upper surface of the sunshade 65, the rear end 65a of the sunshade 65 is tilted upward sharply by the coil spring 73 to open the roof opening 7.

The second tilting mechanism comprises the presser pin 75 and the cam projection 77. When the presser pin 75 is positioned in the vicinity of the rear side of the cam projection 77, the rear end 65a of the sunshade 65 is slightly tilted upward by the coil spring 73. The amount of the tilt is set such that the sunshade 65 does not interfere with a rubber 81 fitted to the edge of the opening of the inner panel 3 when the sunshade 65 is slid into a space 79 formed by the inner panel 3 and the outer panel 5 of the roof 1.

Rain gutter 83 is provided for in the second movable shoe 31.

According to the sunroof apparatus with the above-mentioned arrangement, in order to assemble the third movable shoe 49 to the link 27, the guide pins 45 of the link 27 are inserted into the insertion groove 48 as shown in FIG. 8. Then, the guide pins 45 are guided from the insertion groove 48 to the guide portion 47d for downward tilt. Thus, the link 27 and the third movable shoe 49 are connected by the guide pins 45 such that they are movable relative to each other. In this case, the insertion groove 48 is continuous due to the existence of the reinforcing rib 50 which forms the groove bottom 48a so that the strength of the guide groove 47 may be secured because it has no cut portion.

When the lid 9 is in the fully closed state, the guide pins 45 are located at the guide portion 47a for full close. When the third movable shoe 49 is moved forward by driving the cable 61, the guide pins 45 are moved from the guide portion 47a for full close through the guide portion 47b for pivotal operation to the guide portion 47c for upward tilt of the guide groove 47 to bring the lid 9 into the upwardly tilted state shown in FIG. 3.

At the same time, the presser pin 75 is brought to the presser releasing position in front of the cam projection 77 so that the rear end 65a of the sunshade 65 is tilted upward sharply by the coil spring 73 to open the roof opening 7.

When the third movable shoe 49 is moved backward by driving the cable 61, from the fully closed state shown in FIG. 2 to a position close to the second movable shoe 31, the presser pin 75 is positioned in the vicinity of the rear side of the cam projection 77 to tilt the rear end 65a of the sunshade 65 upward slightly. At the same time, the guide pins 45 are moved from the guide portion 47a for full close to the guide portion 47d for downward tilt. Accordingly, as shown in FIG. 4, there is effected the downwardly tilted state in which the rear end of the lid 9 comes below the outer panel 5.

Through the operations mentioned in the above, the projecting tongue 51 is moved with the third movable shoe 49 in the same direction to turn the hook 37 in the counterclockwise direction around the pin 35. Due to the turn, the fitting portion 39 is released from the fitting hole 43, and the fitting projection 53 is inserted into the fitting hole 55 of the hook 37 to connect the second movable shoe 31 to the third movable shoe 49 solidly. When the cable 61 is further driven in the same direction from the above state, the second and third movable shoes 31 and 49 together with the lid 9 are moved backward to effect an open state in which the roof opening 7 is opened widely.

The amount of pivotal movement of the lid 9 corresponds to the amount of the movement of the guide pins 45 in the guide grooves 47, namely the movement of the guide pins 45 from the guide portion 47c for upward tilt to the guide portion 47d for downward tilt. In other words, the guide pins 45 after assembly never approach the insertion groove 48, and, therefore, the guide pins 45 never come off the third movable shoe 49 while the lid 9 is operating.

Further, the hook 37 is not visible from the outside so that it may be impossible to play with the hook 37. Moreover, since the guide portions 47a and 47b define at their junction a downwardly extending V-shape, the weather strip 11 is not pushed by the outer panel 5 at the time when the lid 9 is lifted and lowered so that the weather strip 11 is protected from being damaged.

FIG. 7 shows a second embodiment of the present invention. In this embodiment, one end of a linking member 139 is connected to the rear end of a bracket 13 fitted to a lid 9, and the other end thereof is extended forwardly and pivoted to a rear shoe 143. The rear shoe 143 has a hook 145 which is pushed in the counterclockwise direction around a pin 147 as shown in FIG. 7. The hook 145 has, at one end thereof, a fitting portion 145a to be fitted to a fitting hole 113b formed on a rail, and, at the other end thereof, a fitting hole 145b to which a fitting projection 139a of the link 139 is fitted. At substantially the center of the link 139, there is provided guide pins (guiding members) 149 to project sidewardly. The guide pins 149 are engaged with guide groove 151a formed on a lifting shoe (movable member) 151 which resembles to the one described in connection with the first embodiment. The lifting shoe 151 is movably disposed behind the rear shoe 143 on a guide rail 19.

To operate the sunroof apparatus of the second embodiment, a cable is driven similar to the first embodiment to move the lifting shoe 151 forward from a fully closed state. Then the guide pins 149 are moved along the guide groove 151a, and the link 139 is turned in the counterclockwise direction to lift the lid 9 up to a position indicated by chain line to put the lid 9 in an upwardly tilted state. When the lifting shoe 151 is moved backward from the fully closed state indicated by solid line, the link 139 is turned in the clockwise direction to tilt the lid 9 downward. At the same time, the fitting projection 139a engages with the fitting hole 145b of the hook 145 to turn the hook 145 in the clockwise direction. Due to this, the fitting portion 145a is released from the fitting hole 113b of the rail. Under this state, the front and rear shoes 21 and 143, the lifting shoe 151, and the lid 9 are together moved backward in the cabin of the vehicle to open an opening 7. To close the opening 7 from the upwardly tilted state or from the fully opened state, the operations mentioned in the above will be carried out in the reversed sequence.

As described in the above, according to the present invention, a lid in the upwardly tilted state is supported by a link member which has one end connected to the lid and the other end extending backwardly or forwardly to be connected to the vehicle body, as well as having a central portion supported by a movable member. Accordingly, compared with the prior art supporting technique in which a lid is supported at a position in front of the center of the lid in a cantilever state, the present invention can improve the rigidity of the lid remarkably. As a result, the lid will not rattle even when it is subjected to the vibration of the running vehicle.

According to the embodiments of the sunroof lid lifting apparatus, the guide pins are easily inserted through the insertion grooves so that the workability and the efficiency in assembly can be improved. Further, since the insertion grooves are formed integrally with the groove bottoms, the guide grooves are formed without any cut portion so that the strength thereof does not deteriorate.

What is claimed is:

1. An apparatus for opening and closing a vehicle body roof lid, comprising:
   a first shoe slidable along the vehicle body, the first shoe supporting an end of the roof lid;
   a second shoe slidable along the vehicle body;
   a link pivotally connected at one end to the roof lid and pivotally connected at its other end to the second shoe;
   a third shoe slidable along the vehicle body between the first and second shoes, the link being pivotally attached at its central portion to the third shoe;
   guide grooves in the third shoe;
   outwardly extending pins affixed to the link at the central portion, the pins engaging the grooves in the third shoe;
   hook means carried by the second shoe, the hook means being fitted to engage the vehicle body and restrict the movement of the second shoe; and
   means for moving the third shoe selectively toward the first or second shoe, thereby to pivotally open or close the roof lid.

2. The apparatus of claim 1, wherein the third shoe includes opposed walls between which the link is pivotally contained, the grooves disposed in facing relationship on the walls of the shoe.

3. The apparatus of claim 2, wherein the link has a thickness substantially equal to the clearance between the opposed walls, so that the movement of the link from side to side is limited as it pivots.

4. The apparatus of claim 1, wherein the link is pivotally attached to the lid at an intermediate position between the first and second shoes.

5. The apparatus of claim 1, further including a spring actuated sunshade, the spring being actuated by the movement of a pin fixed to the third shoe.

* * * * *